United States Patent [19]

Osborne

[11] Patent Number: 5,567,083
[45] Date of Patent: Oct. 22, 1996

[54] DOUBLE-CONTAINMENT UNDERGROUND PIPING SYSTEM

[75] Inventor: Keith J. Osborne, Glen Ellyn, Ill.

[73] Assignee: Intelpro Corporation, Chicago, Ill.

[21] Appl. No.: 469,651

[22] Filed: Jun. 6, 1995

Related U.S. Application Data

[63] Continuation of Ser. No. 286,893, Dec. 20, 1988.

[51] Int. Cl.⁶ .................................................. F16L 1/00
[52] U.S. Cl. ........................ 405/154; 285/133.1; 405/52; 405/128
[58] Field of Search ..................... 405/154, 157, 405/52, 53, 128, 184; 285/133.1, 93, 236, 138, 192, 365; 73/49.2 T, 49.5 R; 138/111–114, 121

[56] References Cited

U.S. PATENT DOCUMENTS

| | | | |
|---|---|---|---|
| 2,546,348 | 3/1951 | Schuman | 285/138 X |
| 2,956,586 | 10/1960 | Zeigler et al. | 285/133.1 X |
| 3,841,671 | 10/1974 | Walker | 285/321 X |
| 4,644,780 | 2/1987 | Jeter | 73/40.5 R |
| 4,787,772 | 11/1988 | Wagner | 405/53 |
| 4,805,444 | 2/1989 | Webb | 73/40.5 R |
| 4,932,257 | 6/1990 | Webb | 73/40.5 R |

Primary Examiner—Dennis L. Taylor

[57] ABSTRACT

A double piping system connected between an underground storage tank and the above ground liquid dispenser is used to provide containment of the pumped liquids from the underground piping system into the environment. The piping system can be tested or replaced from grade without excavating or breaking ground at the installed tank site. Also, disclosed is a method for detecting such leaks and for the gravity drainage of such leaks into a containment chamber.

2 Claims, 5 Drawing Sheets

000

DOUBLE-CONTAINMENT UNDERGROUND PIPING SYSTEM

FIELD OF THE INVENTION

This application is a continuation of prior application Ser. No. 07/286,893, filed Dec. 20, 1988.

The present invention relates to an improved underground piping system for underground tanks used to store hydrocarbon fuels or the likes.

BACKGROUND OF THE INVENTION

Studies by the United States Environmental Protection Agency have found that approximately two-thirds of the leaks in underground storage tanks can be traced to failure of an underground piping system rather than to the tank itself. Specific locations include Joints such as unions, elbows and couplings where two straight pieces of pipe are Joined together, connections to underground equipment, and corroded steel pipes.

Also, structural failure in piping systems can occur when movements take place in tanks and/or piping systems due to high water tables or settling ground movement. This is particularly true in the case of rigid fiberglass piping systems which are subject to cracking or outright structural failure.

SUMMARY OF THE INVENTION

The present invention provides a piping system for conveying fluid from the outlet port of a pump to the inlet port of a fluid dispenser. The system comprises a primary pipe of flexible material having an inlet end and an outlet end, a secondary pipe of flexible material generally surrounding the primary pipe, a pump coupling removably coupled to the outlet port of the pump, a dispenser coupling removably coupled to the inlet port of the fluid dispenser, and two secondary couplings. A secondary pump coupling removably secures the pump end of the secondary pipe to the outer piping adapter of the pump coupling. A secondary dispenser coupling removably secures the dispenser end of the secondary pipe to the outer piping adapter of the dispenser coupling.

The pump coupling comprises an inner pipe in communication with the outlet port of the pump and an outer piping adapter concentric with the inner pipe. The dispenser coupling comprises an inner pipe in communication with the inlet port of the fluid dispenser and an outer piping adapter concentric with the inner pipe. The inlet end of the primary pipe is removably secured to the inner pipe of the pump coupling, and the outlet end of the pipe is removably secured to the inner pipe of the dispenser coupling.

The secondary pump-body coupling comprises a first male coupling adapted to mate with the outer piping adapter of the pump coupling and a second male coupling and a second male coupling adapted to mate with the dispenser end of the secondary pipe.

In accordance with the present invention, the annular volume defined by the primary pipe, the secondary pipe, the pump-body coupling, secondary pump-body coupling, the dispenser coupling and the secondary dispenser coupling provides containment for the fluid in the event of leakage from the primary pipe.

It is an object of the present invention to prevent or decrease the inadvertent leakage of hazardous liquid such as hydrocarbon fuel into the environment from an underground storage tank piping system.

The present invention provides a double-walled flexible piping system especially suitable for underground tanks Used to store hydrocarbon fuels.

An advantage of the present invention is that only two connections are required in the underground piping system.

Another advantage is that the piping can be replaced without excavating or breaking ground at the installed tank site.

An additional advantage is that piping is readily accessible from grade for structural testing without excavating or breaking ground at the installed tank site.

It is a feature of the present invention that in the event of a leak of the piping, the leak is virtually totally contained within the annular space between the primary and secondary pipe or in the pipe containment chamber and is not discharged to the surroundings.

An additional feature of a preferred embodiment of the present invention is that a sensor placed between the walls of the two concentric pipes provides a method of detecting any release from the primary pipe, e.g. causing an alarm to sound.

An additional feature of a preferred embodiment is that any leakage from the primary pipe into the annular space between the primary and secondary pipes, can be drained into a containment chamber, where it can be removed without contaminating the environment.

An additional feature of an alternative embodiment is that any leakage into the annular space between the primary and secondary pipe can be removed by suction at the dispenser connection above ground, where it can be removed without contaminating the environment.

DETAILED DESCRIPTION

Figure 1:
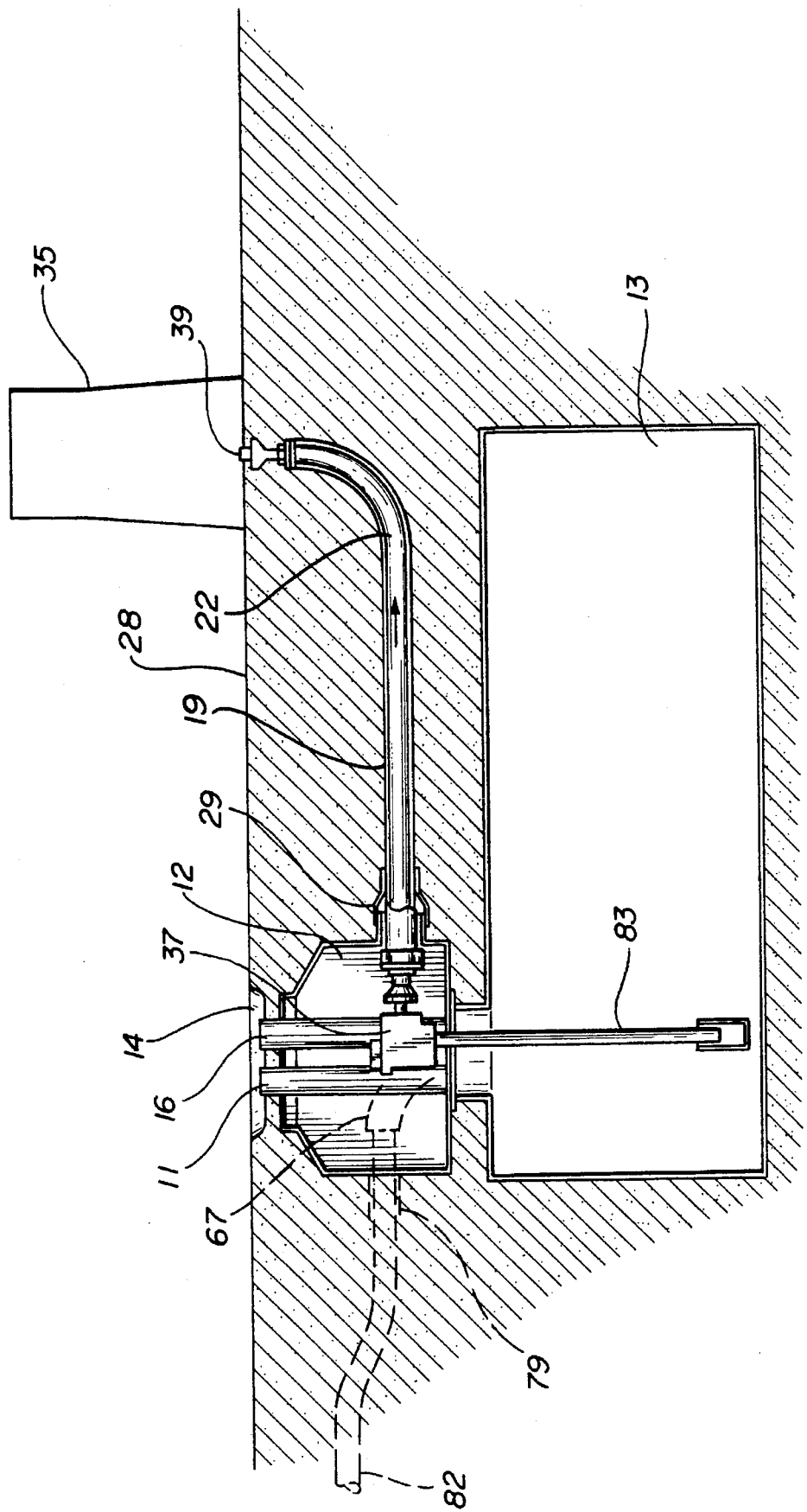
FIG. 1 is an elevational cross-section of an installed underground fuel storage tank provided with a piping system in accordance with the present invention.

FIG. 1 shows a conventional underground fuel tank 13 with a single manway 14 at grade level 28, equipped with a conventional containment chamber 12, which provides access to the pump 37 and the underground piping 19,22 connected to it. The underground tank 13 is filled with fuel by opening the manway 14 and transfering fuel to tank 13 through the fill pipe 16.

A pump 37 is provided to pump fuel from the underground tank 13 through a primary pipe 22 to a fuel dispenser coupling 39 providing input to a fuel dispenser 39. The fuel dispenser 35 may be a conventional service station gas pump. In accordance with the present invention, a secondary pipe 19 jackets the primary pipe 22 and provides containment for any that might leak out of primary pipe 22.

To enter the containment chamber 12, one removes the manway cover 14, exposing the vapor recovery pipe 11 and the fill pipe 16, which can then be removed from grade level 28.

Figure 2:
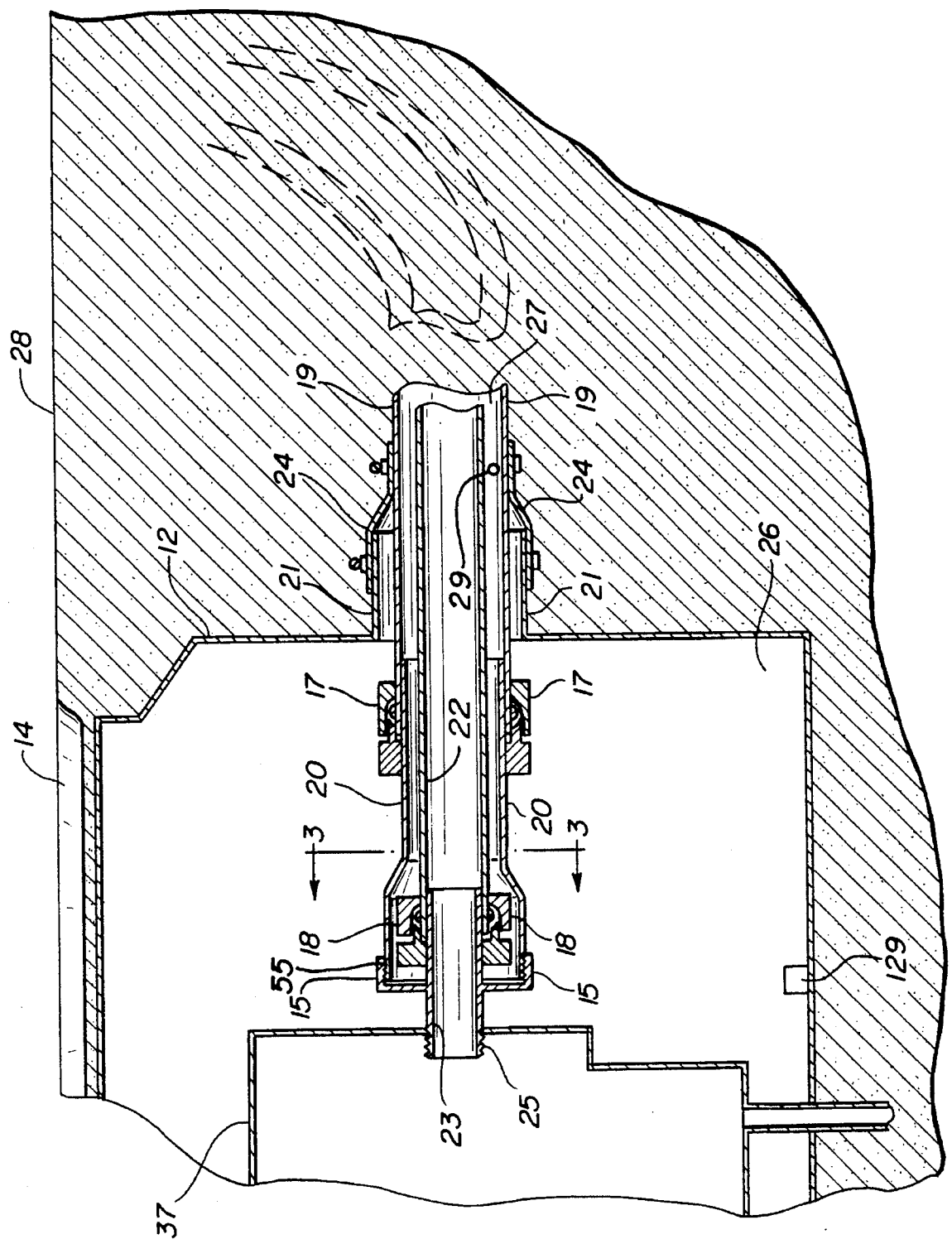
FIG. 2 is an elevational cross-section of a portion of the piping system of fig. 1 showing in greater detail the connection of the flexible pipe with the pump body.
Figure 3:
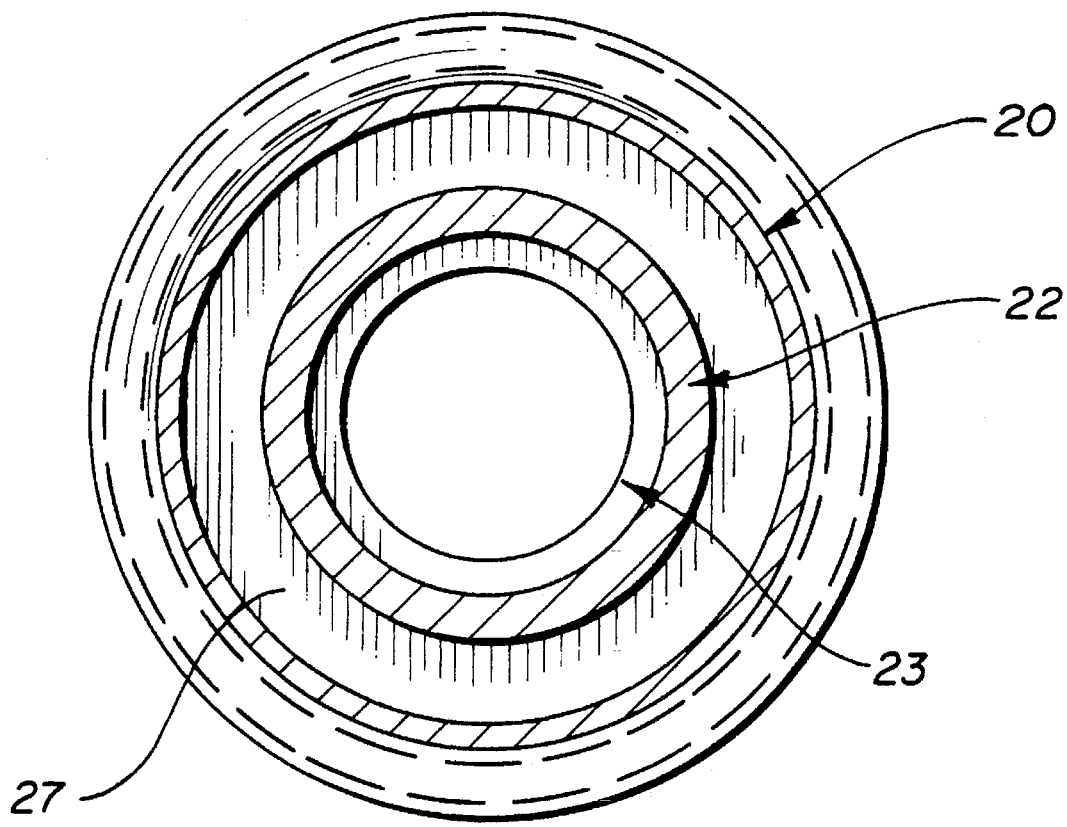
FIG. 3 is a cross-section taken along the line 3—3 of Fig. 2.

As shown in FIG. 2, the compression fittings 17, 18 for the secondary pipe 19 and the primary pipe 22 are now accessible from the containment chamber 12. The compression fitting 17 for the secondary pipe 19 is disconnected. The male-threaded coupling 20 is next unscrewed from the female-tapped piping adaptor 15, and the male coupling 20 is forced away from the pump body and adaptor, thereby exposing the compression fitting 18 connecting the inner pipe 12 with the adaptor 23. The compression fitting 18 can now be disconnected, thus disconnecting the primary pipe 22 and the secondary pipe 19 from the piping adaptor and the pump body 37. The other ends of the primary pipe 22 and secondary pipe 19 are similarly disconnected from the dispenser coupling 39 at or about grade level 28.

The inner primary pipe 22 can now be "fished" or pulled up and out from the outer secondary pipe 19 from grade level 28. The primary pipe 22 and the secondary pipe 19 are accessible at both ends—below grade at the interface with the containment chamber, and at or about grade level 28 at the fuel dispenser coupling 39. Since the pipes 19, 22 are flexible, the pipe may be shipped to the field site where the tank is installed and cut at the job site to the desired length.

The piping adaptor 23 is a forged or cast custom fitting comprising two-inch outside diameter inner pipe connected to the outlet pump body 12, below ground. The dispenser coupling 39 is a corresponding fitting connected to the dispenser inlet port. The flexible primary pipe 22, desirably of two-inch inner diameter, fits over the piping adaptor 23. The compression fitting 18 clamps and firmly secures the primary pipe 22 to the piping adaptor 23. The length of the inner pipe of the piping adaptor 23 is typically two pipe diameters. The compression fitting 18 may be substituted with a common hose clamp, strap or other fitting.

The male coupling 20 is a 4-inch outside diameter steel pipe adapter with external threads. It screws at one threaded end 25 into the outer piping adapter, 15. The flexible secondary pipe 19 is desirably of 4-inch inside diameter hose piping. It slides over the free end of the male coupling 20. A compression fitting 17 clamps and firmly secures the secondary pipe 19 to the male coupling 20.

After installation of the flexible piping system, the outside secondary pipe 19 is rendered inflexible as it is buried in the ground. The outside pipe 19 serves as a guide for the primary pipe 22 which slides into or is retractable from it.

The piping adaptor 23 has a male thread 25, that screws into the pump body 12. (In some cases where the pump has a standard male connection, a standard pipe coupling may be necessary to connect the piping adaptor.) Once the piping adaptor 23 is screwed into the outlet port of the pump body 12, the piping adaptor 23 is fixed and is generally not removed.

A boot 14 is used to seal the entry of the secondary pipe 19, where it enters the containment chamber 12 by connecting to a sleeve 21 which is an integral part of the containment chamber 12.

If the primary inner pipe 22 leaks, the leakage is contained in the annular space 23 between the primary pipe 22 and secondary pipe 19, and will not escape into and flood the containment chamber 12. If a leak arises at the Juncture of the pipe 22 and pump body 12, or at either of the two compression fittings 17 or 8, the presence boot 24 ensures that leak is contained in the piping containment chamber 12 at 26 and does not overflow into the surrounding soil. The boot 24 also prevents leakage from the fill pipe 16 from escaping from the containment chamber 11 into the soil.

The annular space between the coaxial primary pipe 22 and secondary pipe 19 can be tested for leakage in the inner pipe 19 by locating sensors in the annular space 23 between the pipes 22 and 19.

INSTALLATION METHOD

First, the flexible outer secondary pipe 19 is installed below the ground, and then the flexible inner primary pipe 22 is inserted from the grade level 28 into the previously installed outer pipe 19. The below-ground ends of the two concentric pipes 19,22 are mechanically connected inside the containment chamber 12, which is made accessible by removal of manhole cover 14. The above-ground ends of the two concentric pipes 19,22 are mechanically connected inside the containment pan 138 below the fuel dispenser 35.

Accordingly there are only two mechanical fitting in the piping run—the connection at the containment chamber 12, and the connection at the containment pan, 138. In accordance with the present invention, mechanical piping connections at which the underground pipe is likely to leak and which cannot be inspected visually from above ground is the only one. This must be compared with conventional piping systems wherein many underground connections are employed, and which are buried and inaccessible. To reach these connections it is necessary to excavate much of the piping system in order to find a leak. Furthermore, in the event of a leak at the connection 18 between the underground piping 22 and the containment chamber 12, coupling 18 may be snapped open and the inner pipe 22 may be replaced with a new pipe underground without disturbing the concrete slab at grade level 28. So the underground piping is replaceable from grade 28 and without going underground.

It is apparent that the objects of the invention are fulfilled by the foregoing disclosure. It is to be understood, however, that many modifications may be made to the basic invention, some of which have been mentioned above. These and other modifications are to be deemed within the spirit and scope of the above-disclosed invention, which should be interpreted with reference to the following claims.

Figure 4:
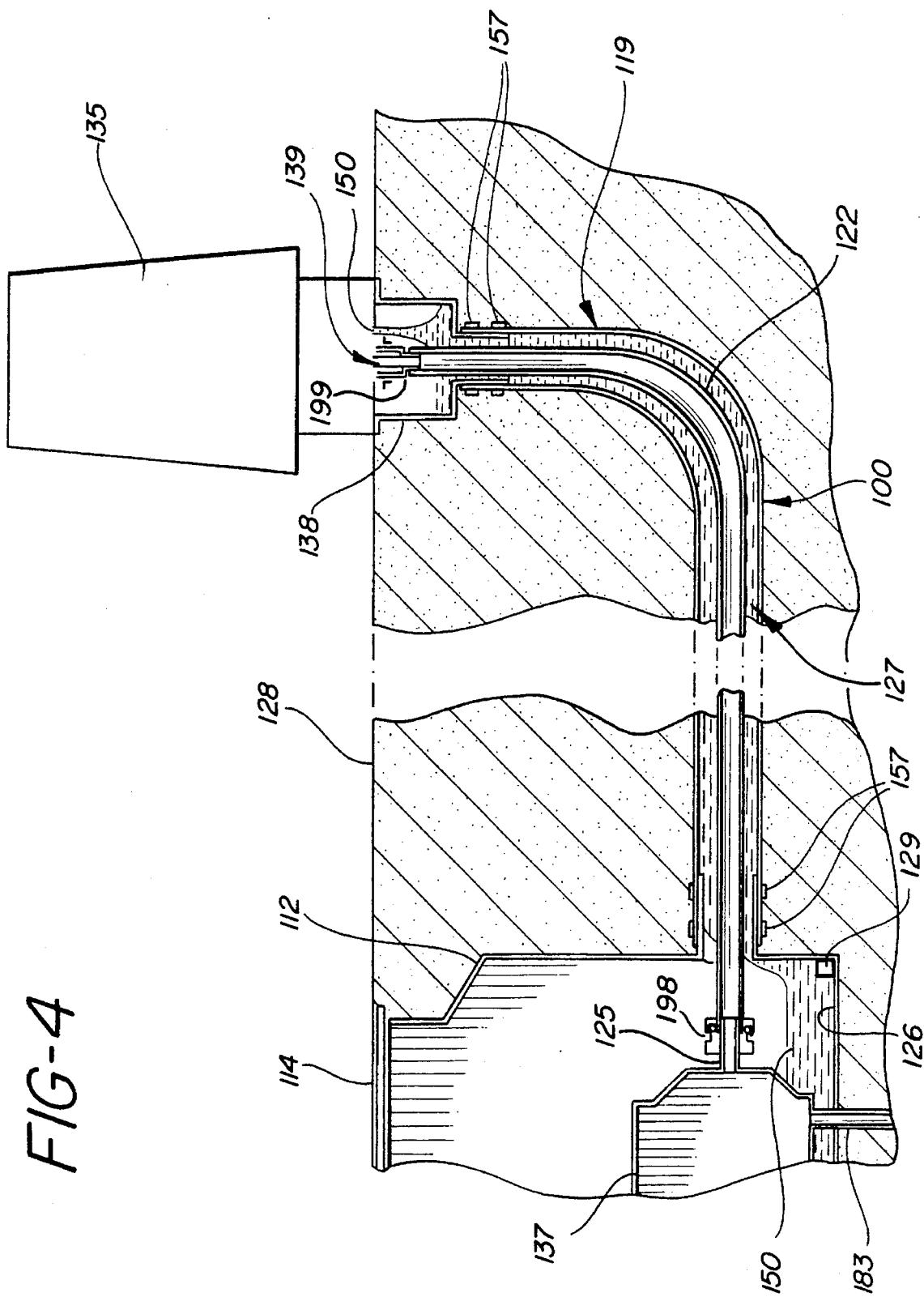
FIG. 4 is an elevational cross-section of the flexible piping system of Fig. 1 showing in greater detail the connection of the flexible pipe with the fuel dispenser.

In FIG. 2, containment of the liquid, in the event of a leak in the primary pipe 22, will be held in the secondary or containment pipe 19. FIG. 4 schematically illustrates a similar gas dispensing station with an alternate embodiment for securing the primary and secondary pipes to the pump adapter at one end and the dispenser at the other end in an underground storage tank - dispenser piping system. In FIG. 4, a leak from the primary or product pipe 122 will flow into the secondary containment pipe 119 from which it will drain by gravity to 126 in the leak containment chamber 112. The coupling securing the primary pipe 122 to the secondary or containment pipe 119 at the base of the dispenser 135, 135 is connected to the bottom of the shear valve 139. This coupling is substantially similar to the coupling at the other end of the double piping system in the containment chamber 112. The secondary or containment pipe 119 is connected directly to sleeves that protrude from the containment pan 138 at one end and the containment chamber 112 at the other end. The method of connection may be stainless steel straps or bands 157, applied in the field with a strap tightening and clamping tool. Alternatively, a compression fitting may be used. Access to the containment chamber 112 is provided through the manway 114.

In either of the embodiments illustrated in FIG. 2 or 4, monitoring systems are installed at the leak collection chamber 36 or 136 and necessary repairs can be performed without a "release" to the environment. In both the described embodiments, the primary pipe 22 or 122 can be replaced from above ground.

The material of the primary pipe 22 or 122, and the secondary pipe 19 or 119 in the two depicted embodiments is similar to the conventional 'hose' construction, i.e. reinforced rubber or plastic material suitable for gasoline service.

A gasoline delivery hose—while having a short life-span above ground—will exhibit a substantially longer life when used below ground in darkness (i.e. out.of bright sunlight) and in a stationary condition, as illustrated in FIGS. 1,2 & 4. In such use, there will be no: degradation of pipe material due to exposure to sunlight; deterioration of pipe material due to wear and tear which accompanies to the frequent movement of the pipes as is now the case with conventional above ground piping systems. Under such circumstances, the life expectancy of the underground piping system shown in FIGS. 1,2 or 4 will exceed 10 years instead of the approximately 4 year average life expectancy of conventional above ground pipe systems.

Figure 5:
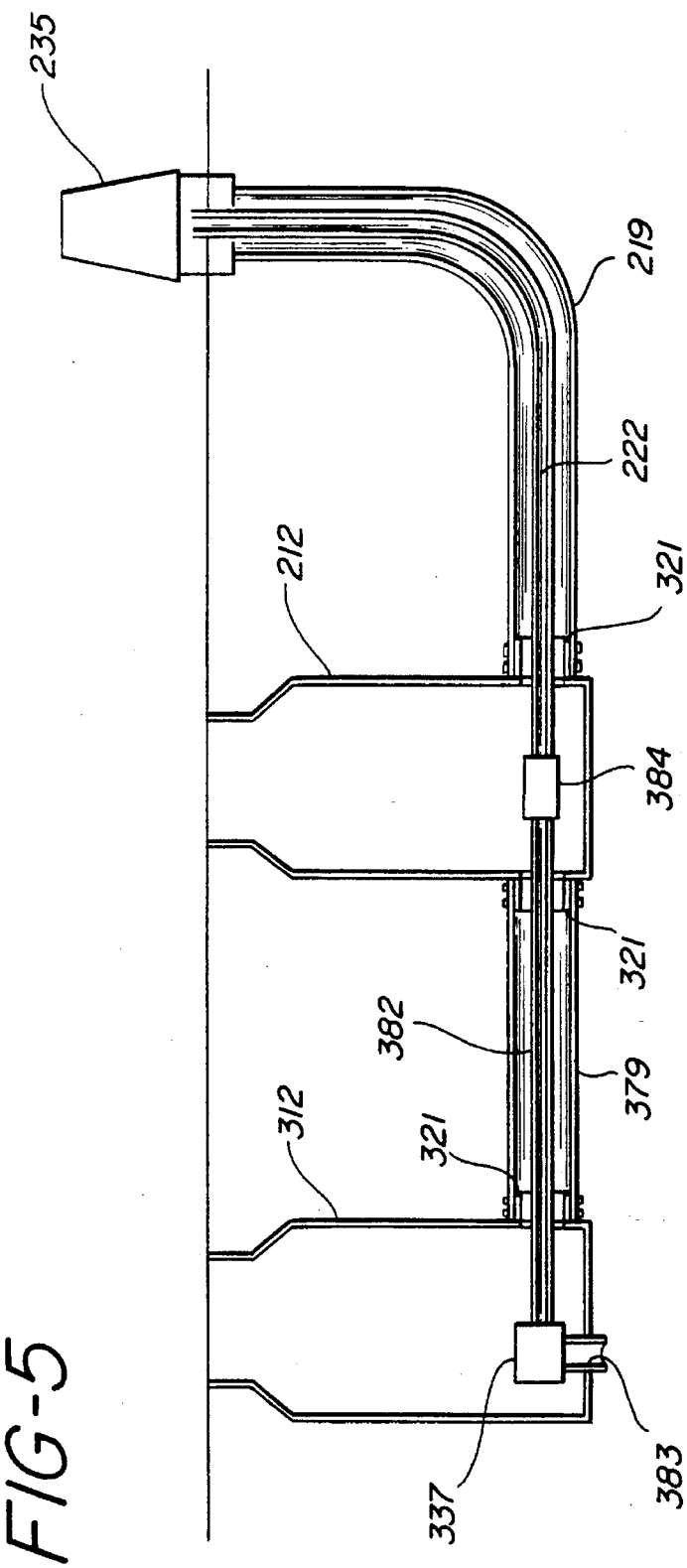
FIG. 5 is an elevational cross-section of the flexible piping run/manifold connection to other underground storage tank systems.
Figure 7:
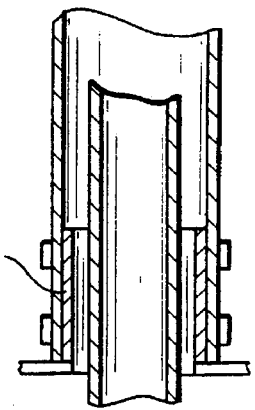
Figure 6:
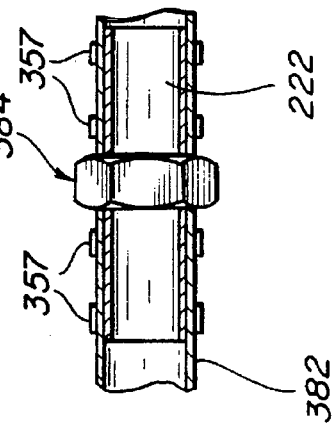

Furthermore, in the event of very long runs of pipe between the fuel storage tank and the fuel dispenser, a repeater containment chamber 312 may be placed in the pipe run. The piping containment chamber 212, the primary and secondary piping system 222 and 219, the repeater containment chamber 312 and the fuel dispenser 235 is schematically shown in FIG. 5. The use of repeater containment chambers will be necessary in cases where the length of the primary and secondary piping system delivered to the jobsite is less that the distance between the piping containment chamber 312 and the fuel dispenser 235, or if multiple fuel storage tanks are utilized and interconnectors in the piping becomes necessary.

I claim:

1. A secondarily contained piping system comprising:
    (a) a flexible inner supply pipe;
    (b) an outer secondary containment pipe;
    (c) two spaced access chambers designed for underground use which are interconnected in a fluid tight manner through the side wall of one chamber just above the chamber base by the secondary containment pipe;
    (d) all flexible inner supply pipe couplings and associated fittings being disposed within the access chambers;
    (e) a fluid source fitting at one end providing an originating interface to the flexible inner supply pipe;
    (f) a fluid outlet at the other end providing a terminating interface to the flexible inner supply pipe;
    (g) one access chamber being of sufficient size to permit manual or mechanical removal or replacement of the flexible inner supply pipe; and
    (h) the flexible inner supply pipe having sufficient bend radius to be removed and replaced through the access chamber.

2. The system of claim wherein said access chambers are underground access chambers.

* * * * *

(12) EX PARTE REEXAMINATION CERTIFICATE (8162nd)
United States Patent
Osborne

(10) Number: US 5,567,083 C1
(45) Certificate Issued: *Apr. 19, 2011

(54) DOUBLE-CONTAINMENT UNDERGROUND PIPING SYSTEM

(75) Inventor: Keith J. Osborne, Glen Ellyn, IL (US)

(73) Assignee: Pisces by OPW, Inc., Cincinnati, OH (US)

Reexamination Request:
No. 90/010,608, Sep. 8, 2009

Reexamination Certificate for:
Patent No.: 5,567,083
Issued: Oct. 22, 1996
Appl. No.: 08/469,651
Filed: Jun. 6, 1995

( * ) Notice: This patent is subject to a terminal disclaimer.

Related U.S. Application Data

(63) Continuation of application No. 07/286,893, filed on Dec. 20, 1988, now Pat. No. 5,553,971.

(51) Int. Cl.
*F16L 1/00* (2006.01)
*F16L 1/028* (2006.01)
*F16L 1/036* (2006.01)

(52) U.S. Cl. ........................... 405/154.1; 405/52
(58) Field of Classification Search .................. None
See application file for complete search history.

(56) References Cited

U.S. PATENT DOCUMENTS

| | | |
|---|---|---|
| 216,286 A | 6/1879 | Miller |
| 244,752 A | 7/1881 | Hunter et al. |
| 272,833 A | 2/1883 | Goodfellow |
| 286,938 A | 10/1883 | Martin |
| 291,715 A | 1/1884 | Geives et al. |
| 430,010 A | 6/1890 | Flad |
| 470,946 A | 3/1892 | Munsie |
| 648,128 A | 4/1900 | Kinniburgh |
| 745,351 A | 12/1903 | Hungerford |
| 997,434 A | 7/1911 | Barnes |
| 1,188,446 A | 6/1916 | Haines |
| 1,375,363 A | 4/1921 | Cary et al. |
| 1,986,789 A | 1/1935 | Bennett |
| 2,050,968 A | 8/1936 | Gottwald et al. |
| 2,093,114 A | 9/1937 | Sommenfeld |
| 2,113,204 A | 4/1938 | Wasser |
| 2,129,924 A | 9/1938 | Galbraith |
| 2,268,263 A | 12/1941 | Newell et al. |
| 2,306,331 A | 12/1942 | Elmer |
| 2,325,565 A | 7/1943 | Williams |
| 2,336,150 A | 12/1943 | Horvath |

(Continued)

FOREIGN PATENT DOCUMENTS

| | | |
|---|---|---|
| EP | 0207015 A3 | 12/1986 |
| EP | 0207015 A2 | 12/1986 |
| GB | 1374874 | 11/1974 |
| GB | 1390280 | 4/1975 |
| GB | 2023296 | 12/1979 |
| JP | 51-003055 | 1/1976 |
| JP | 57-011800 | 1/1982 |
| JP | 57-146126 | 9/1982 |
| JP | 62-23000 | 2/1987 |
| JP | SHO 62-23000 | 2/1987 |
| JP | 62-200630 | 12/1987 |
| WO | 90/04157 | 4/1990 |

OTHER PUBLICATIONS

Environmental Protection Agency, Proposed Rules, 40 CFR Part 280, Underground Storage Tanks; Technical Requirements, Apr. 17, 1987, p. 1–286.

(Continued)

*Primary Examiner*—Patricia L Engle

(57) ABSTRACT

A double piping system connected between an underground storage tank and the above ground liquid dispenser is used to provide containment of the pumped liquids from the underground piping system into the environment. The piping system can be tested or replaced from grade without excavating or breaking ground at the installed tank site. Also, disclosed is a method for detecting such leaks and for the gravity drainage of such leaks into a containment chamber.

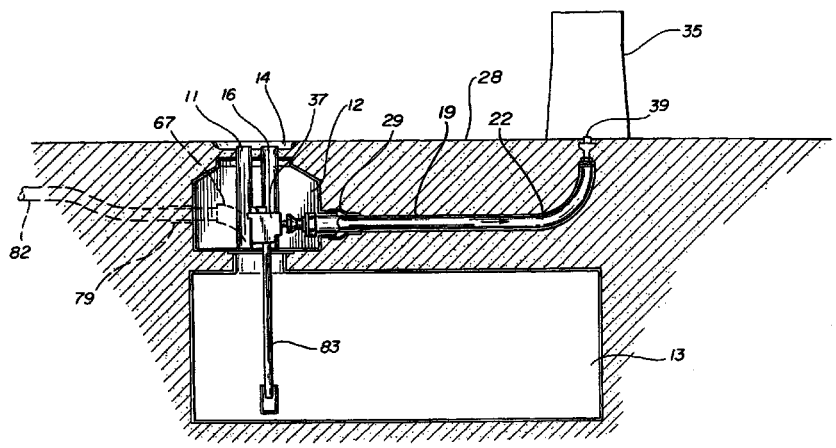

U.S. PATENT DOCUMENTS

| | | |
|---|---|---|
| 2,347,912 A | 5/1944 | Komives |
| 2,487,939 A | 11/1949 | Norton |
| 2,507,597 A | 5/1950 | Holdridge |
| 2,546,348 A | 3/1951 | Schuman |
| 2,956,586 A | 10/1960 | Zeigler et al. |
| 3,221,758 A | 12/1965 | Morse |
| 3,299,417 A | 1/1967 | Sibthorpe |
| 3,379,027 A | 4/1968 | Mowell et al. |
| 3,531,264 A | 9/1970 | Greipel |
| 3,543,377 A | 12/1970 | Bremner |
| 3,559,408 A | 2/1971 | Earnhart |
| 3,672,103 A | 6/1972 | Kost |
| 3,688,801 A | 9/1972 | Rohrer |
| 3,721,270 A | 3/1973 | Wittgenstein |
| 3,799,440 A | 3/1974 | Goss et al. |
| 3,841,671 A | 10/1974 | Walker |
| 3,850,457 A | 11/1974 | Bigotte et al. |
| 3,974,862 A | 8/1976 | Fuhrmann |
| 3,980,112 A | 9/1976 | Basham |
| 3,995,472 A | 12/1976 | Murray |
| 4,009,739 A | 3/1977 | Weatherford |
| 4,010,581 A | 3/1977 | Keturi et al. |
| 4,020,641 A | 5/1977 | Takada |
| 4,062,376 A | 12/1977 | McGrath |
| 4,094,536 A | 6/1978 | Cole et al. |
| 4,110,947 A | 9/1978 | Murray et al. |
| 4,127,286 A | 11/1978 | Albertsen |
| 4,132,083 A | 1/1979 | McGrath |
| 4,149,568 A | 4/1979 | Kuntz et al. |
| 4,159,027 A | 6/1979 | Caillet |
| 4,274,549 A | 6/1981 | Germain |
| 4,309,128 A | 1/1982 | Williams |
| 4,315,408 A | 2/1982 | Karl |
| 4,318,835 A | 3/1982 | Clarke |
| 4,411,290 A | 10/1983 | Heath |
| 4,449,853 A | 5/1984 | Mennella et al. |
| 4,457,349 A | 7/1984 | Vazin |
| 4,472,911 A | 9/1984 | Jooris et al. |
| 4,519,634 A | 5/1985 | Hand |
| 4,561,292 A | 12/1985 | Pugnale et al. |
| 4,565,351 A | 1/1986 | Conti et al. |
| 4,612,744 A | 9/1986 | Shamash |
| 4,619,555 A | 10/1986 | Skinner et al. |
| 4,639,164 A | 1/1987 | Pugnale et al. |
| 4,643,460 A | 2/1987 | Lieberg |
| 4,644,780 A | 2/1987 | Jeter |
| 4,667,505 A | 5/1987 | Sharp |
| 4,678,370 A | 7/1987 | Allen |
| 4,682,911 A | 7/1987 | Moreland |
| 4,685,831 A | 8/1987 | Mahoney |
| 4,702,645 A | 10/1987 | Skinner et al. |
| 4,739,648 A | 4/1988 | Horner |
| 4,770,562 A | 9/1988 | Muller et al. |
| 4,778,310 A | 10/1988 | Moreland |
| 4,787,772 A | 11/1988 | Wagner |
| 4,796,669 A | 1/1989 | Onge |
| 4,796,676 A | 1/1989 | Hendershot et al. |
| 4,805,444 A | 2/1989 | Webb |
| 4,874,268 A | 10/1989 | Akesaka |
| 4,886,304 A | 12/1989 | Kunsman |
| 4,912,966 A | 4/1990 | Sharp |
| 4,932,257 A | 6/1990 | Webb |
| 4,971,477 A | 11/1990 | Webb et al. |
| 4,991,626 A | 2/1991 | Grantham |
| 5,005,613 A | 4/1991 | Stanley |
| 5,042,537 A | 8/1991 | Grantham |
| 5,098,221 A | 3/1992 | Osborne |
| 5,553,971 A | 9/1996 | Osborne |
| 5,567,083 A | 10/1996 | Osborne |
| 5,590,981 A | 1/1997 | Osborne |
| 6,116,817 A | 9/2000 | Osborne |

OTHER PUBLICATIONS

Literature entitled, "ke Rohrsysteme und Umwelttechnik, FLEXWELL®—Saugleitung im Tankstellenbau," (3 pages) in German (Oct. 1987).

Product Information for Piping Sumps, by Owens–Corning Fiberglas Corp., Pub. No. 3–PE–13703 and 3–PE–13704, various sheets (6 pages) (Dec. 1985).

"Catalog for Concrete Professionals," by Concraft Supply, Inc., 7823 Loisdale Rd., Springfield, VA, 22150; 4 pages.

Information Disclosure Statement, U.S. Appl. No. 09/085,747; 3 pages (Sep. 19, 1999).

Information Disclosure Statement, U.S. Appl. No. 09/084,747; 4 pages (May 19, 1999).

Information Disclosure Statement, U.S. Appl. No. 09/084,747; 4 pages (Oct. 12, 1999).

US 5,567,083 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 2 are determined to be patentable as amended.

New claims 3-19 are added and determined to be patentable.

1. A secondarily contained piping system comprising:
   (a) a flexible inner supply pipe;
   (b) an outer secondary containment pipe;
   (c) two spaced access chambers designed for underground use which are interconnected in a fluid tight manner through the side wall of one chamber just above the chamber base by the secondary containment pipe;
   (d) all flexible inner supply pipe couplings and associated fittings being disposed within the access chambers;
   (e) a fluid source fitting at one end providing an originating interface to the flexible inner supply pipe;
   (f) a fluid outlet at the other end providing a terminating interface to the flexible inner supply pipe;
   (g) one access chamber being of sufficient size to permit manual or mechanical removal or replacement of the flexible inner supply pipe; and
   (h) the flexible inner supply pipe having sufficient bend radius to be removed and replaced through the access chamber *wherein said inner supply pipe includes a plurality of segments, each segment being fluidly coupled to an adjacent segment by an intermediate coupling, and wherein the system further includes a plurality of intermediate underground chambers, each intermediate coupling being positioned in one of said intermediate underground chambers.*

2. The system of claim *1* wherein said access chambers are underground access chambers.

3. *The system of claim 1 further comprising an underground pump positioned in one of said access chambers and being fluidly coupled to said inner supply pipe by said fluid source fitting.*

4. *The system of claim 1 wherein the secondary containment pipe is fluidly isolated from at least one of said access chambers.*

5. *The system of claim 1 wherein said each access chamber is configured to contain fluid leaked from said inner supply pipe without contaminating the surrounding environment.*

6. *The system of claim 1 wherein said secondary containment pipe includes an end positioned adjacent to at least one of said access chambers, wherein said end is positioned lower relative to other portions of said secondary containment pipe thereof to enable gravity draining therethrough into at least one of said access chambers.*

7. *The system of claim 1 wherein at least one of said couplings is positioned within said secondary containment pipe.*

8. *The system of claim 1 each of said coupling and fittings are positioned within said secondary containment pipe.*

9. *The system of claim 1 wherein at least one access chamber is configured to contain fluid leaked from said inner supply pipe without contaminating the surrounding environment.*

10. *A secondarily contained piping system comprising:*
    *(a) a flexible inner supply pipe;*
    *(b) an outer secondary containment pipe;*
    *(c) two spaced access chambers designed for underground use which are interconnected in a fluid tight manner through the side wall of one chamber just above the chamber base by the secondary containment pipe;*
    *(d) all flexible inner supply pipe couplings and associated fittings being disposed within the access chambers, and wherein at least one of said couplings is positioned within said secondary containment pipe;*
    *(e) a fluid source fitting at one end providing an originating interface to the flexible inner supply pipe;*
    *(f) a fluid outlet at the other end providing a terminating interface to the flexible inner supply pipe;*
    *(g) one access chamber being of sufficient size to permit manual or mechanical removal or replacement of the flexible inner supply pipe; and*
    *(h) the flexible inner supply pipe having sufficient bend radius to be removed and replaced through the access chamber, wherein said inner supply pipe includes a plurality of segments, each segment being fluidly coupled to an adjacent segment by an intermediate coupling, and wherein the system further includes a plurality of intermediate underground chambers, each intermediate coupling being positioned in one of said intermediate underground chambers.*

11. *The system of claim 10 wherein each of said coupling and fittings are positioned within said secondary containment pipe.*

12. *The system of claim 10 wherein said secondary containment pipe is continuous.*

13. *The system of claim 10 wherein at least one of said access chambers is configured to contain fuel leaked from said inner supply pipe without contaminating the surrounding environment.*

14. *A secondarily contained piping system comprising:*
    *(a) a flexible inner supply pipe;*
    *(b) an outer secondary containment pipe;*
    *(c) two spaced access chambers designed for underground use which are interconnected in a fluid tight manner through the side wall of one chamber just above the chamber base by the secondary containment pipe;*
    *(d) all flexible inner supply pipe couplings and associated fittings being disposed within the access chambers;*
    *(e) a fluid source fitting at one end providing an originating interface to the flexible inner supply pipe;*
    *(f) a fluid outlet at the other end providing a terminating interface to the flexible inner supply pipe;*
    *(g) one access chamber being of sufficient size to permit manual or mechanical removal or replacement of the flexible inner supply pipe; and*
    *(h) the flexible inner supply pipe having sufficient bend radius to be removed and replaced through the access* chamber, wherein at least one of said access chambers is configured to contain fuel leaked from said inner supply pipe without contaminating the surrounding environment.

15. The system of claim 14 wherein said second access chamber is configured to contain fuel leaked from said inner supply pipe without contaminating the surrounding environment.

16. The system of claim 14 wherein said secondary containment pipe includes an end positioned adjacent to at least one of said access chambers, wherein said end is positioned lower relative to other portions of said secondary containment pipe thereof to enable gravity draining therethrough into said at least one access chamber.

17. The system of claim 14 further comprising an underground tank positioned in at least one of said access chambers and being fluidly coupled to said inner supply pipe by said fluid source fitting, and wherein the secondary containment pipe is fluidly isolated from at least one of said access chambers.

18. The system of claim 14 wherein at least one of said access chambers includes a manway providing access therein for a worker from grade level and is sized to receive a worker therein.

19. The system of claim 14 wherein said inner supply pipe includes a plurality of segments, each segment being fluidly coupled to an adjacent segment by an intermediate coupling, and wherein the system further includes a plurality of intermediate underground chambers, each intermediate coupling being positioned in one of said intermediate underground chambers.

\* \* \* \* \*